(12) United States Patent
Tanaka et al.

(10) Patent No.: US 11,944,101 B2
(45) Date of Patent: Apr. 2, 2024

(54) PHOSPHORUS ACID AND ALKYLAMINE OR ALKANOLAMINE STABILIZED COPPER COMPOUND CONTAINING COMPOSITIONS FOR CONTROLLING A PLANT DISEASE CAUSED BY A PHYTOPATHOGENIC ORGANISM

(71) Applicant: NutriAg Ltd., Toronto (CA)

(72) Inventors: Kelly S. E. Tanaka, Toronto (CA); Siu Ming Law, Toronto (CA); Trisevgeni Trissa Kantzas, Georgetown (CA); Martin David Bloomberg, Toronto (CA)

(73) Assignee: NUTRIAG LTD., Toronto (CA)

( * ) Notice: Subject to any disclaimer, the term of this patent is extended or adjusted under 35 U.S.C. 154(b) by 0 days.

(21) Appl. No.: 16/634,214

(22) PCT Filed: Jul. 26, 2018

(86) PCT No.: PCT/CA2018/050912
§ 371 (c)(1),
(2) Date: Jan. 27, 2020

(87) PCT Pub. No.: WO2019/018941
PCT Pub. Date: Jan. 31, 2019

(65) Prior Publication Data
US 2020/0323216 A1 Oct. 15, 2020

Related U.S. Application Data

(60) Provisional application No. 62/537,111, filed on Jul. 26, 2017.

(51) Int. Cl.
*A01N 59/20* (2006.01)
*A01N 33/04* (2006.01)
(Continued)

(52) U.S. Cl.
CPC ............. *A01N 59/20* (2013.01); *A01N 33/04* (2013.01); *A01N 33/08* (2013.01); *A01N 59/26* (2013.01)

(58) Field of Classification Search
CPC ........ A01N 59/20; A01N 33/04; A01N 33/08; A01N 59/26
See application file for complete search history.

(56) References Cited

U.S. PATENT DOCUMENTS 3,930,834 A 1/1976 Schulteis et al.
4,048,324 A 9/1977 Kohn
(Continued)

FOREIGN PATENT DOCUMENTS

AU 2015201322 B2 8/2016
CA 2997205 A1 3/2017
(Continued)

OTHER PUBLICATIONS

International Search Report and Written Opinion of corresponding International Patent Application No. PCT/CA2018/050912 dated Nov. 16, 2018, 12 pgs.
(Continued)

*Primary Examiner* — Bethany P Barham
*Assistant Examiner* — Ayaan A Alam
(74) *Attorney, Agent, or Firm* — Bereskin & Parr LLP/S.E.N.C.R.L., s.r.l.; Sandra Marone

(57) ABSTRACT

The present application relates to aqueous compositions for controlling a plant disease caused by a phytopathogenic organism, to methods of preparing such compositions and to uses of such compositions, for example for controlling a plant disease caused by a phytopathogenic organism. The aqueous compositions comprise copper ions, phosphorous acid and/or a salt thereof and an effective amount of an amine selected from an alkylamine, an alkanolamine and
(Continued)

mixtures thereof. The pH of the compositions is from about 6 to about 10.

21 Claims, 7 Drawing Sheets

(51) Int. Cl.
*A01N 33/08* (2006.01)
*A01N 59/26* (2006.01)

(56) References Cited

U.S. PATENT DOCUMENTS

| | | | |
|---|---|---|---|
| 4,075,324 | A | 2/1978 | Thizy et al. |
| 4,324,578 | A | 4/1982 | Seymour et al. |
| 4,505,734 | A | 3/1985 | Freedenthal et al. |
| 5,078,912 | A | 1/1992 | Goettsche et al. |
| 5,276,029 | A * | 1/1994 | Goettsche ............... A01N 33/04 424/630 |
| 5,514,200 | A | 5/1996 | Lovatt |
| 5,853,766 | A | 12/1998 | Goettsche |
| 5,910,496 | A | 6/1999 | Albert et al. |
| 6,689,392 | B2 | 2/2004 | Lifshitz |
| 6,720,313 | B1 | 4/2004 | Maynard |
| 7,476,371 | B2 | 1/2009 | Richardson et al. |
| 2002/0193351 | A1 | 12/2002 | Taylor |
| 2009/0092682 | A1 | 4/2009 | Stringfellow |
| 2010/0136132 | A1 | 6/2010 | van der Krieken et al. |
| 2010/0233146 | A1 | 9/2010 | McDaniel |
| 2010/0255116 | A1 | 10/2010 | Mitani et al. |
| 2011/0028500 | A1 | 2/2011 | Su et al. |
| 2011/0033436 | A1 | 2/2011 | Chen et al. |
| 2011/0281807 | A1 | 11/2011 | Ohara et al. |
| 2014/0194288 | A1 * | 7/2014 | Grobler ............... A01N 25/04 504/136 |
| 2015/0056258 | A1 * | 2/2015 | Richardson ............... B27K 3/08 424/409 |

FOREIGN PATENT DOCUMENTS

| | | |
|---|---|---|
| EP | 0466612 B1 | 11/1994 |
| EP | 0542071 B1 | 9/1995 |
| FR | 2867026 A1 | 9/2005 |
| GB | 2238960 B | 7/1993 |
| IN | 272109 B | 3/2016 |
| KR | 1020140112480 A | 9/2014 |
| WO | 2002060248 A2 | 8/2002 |
| WO | 2005051961 A1 | 6/2005 |
| WO | 2006128677 A2 | 12/2006 |
| WO | 2009082206 A1 | 7/2009 |
| WO | 2013064798 A1 | 5/2013 |
| WO | 2015089358 A1 | 6/2015 |
| WO | 2016161250 A2 | 10/2016 |
| WO | 2016170784 A1 | 10/2016 |

OTHER PUBLICATIONS

Supplementary European Search Report of corresponding European Patent Application No. 18837342.7 dated Apr. 10, 2021, 10 pgs.
Wikipedia, Chelation, https://en.wikipedia.org/w/index.php?title=Chelation&oldid=783030982, May 30, 2017, 5 pages.
Office Action issued in corresponding Israel Patent Application No. 272205 (English Translation).

* cited by examiner

PHOSPHORUS ACID AND ALKYLAMINE OR ALKANOLAMINE STABILIZED COPPER COMPOUND CONTAINING COMPOSITIONS FOR CONTROLLING A PLANT DISEASE CAUSED BY A PHYTOPATHOGENIC ORGANISM

RELATED APPLICATIONS

This application is a National Phase of co-pending International Application No. PCT/CA2018/050912 filed on Jul. 26, 2018, which claims the benefit of priority from U.S. Provisional Patent Application No. 62/537,111 filed on Jul. 26, 2017 the contents of each of which are incorporated herein by reference

FIELD

The present application relates to aqueous compositions for controlling a plant disease caused by a phytopathogenic organism, to methods of preparing such compositions and to uses of such compositions, for example for controlling a plant disease caused by a phytopathogenic organism.

BACKGROUND

The use of certain compositions comprising copper ions, phosphorous acid and/or salts thereof or mixtures of copper ions and phosphorous acid and/or salts thereof for controlling plant diseases such as those caused by various phytopathogenic fungi and bacteria has been disclosed.

For example, U.S. Pat. No. 6,689,392 discloses a composition for controlling growth of pathological organisms on a plant comprising one or more metal ions, one or more chelating agents and phosphorous acid and/or a salt or hydrate thereof. Copper is one example of a list of exemplary metal ions. The chelating agent is a synthetic or natural molecule that binds to metal ions exemplified by ethylenediaminetetraacetic acid (EDTA), ethylenediamine-N,N'-bis (2-hydroxyphenylacetic acid) (EDDHA), N-{2-[bis(carboxymethyl)amino]ethyl}-N-(2-hydroxyethyl)glycine (HEDTA), diethylenetriaminepentaacetic acid (DTPA), citrate, saccharate, gluconate, glucoheptonate and glycine.

U.S. Pat. No. 4,075,324 discloses fungicidal compositions containing phosphorous acid, inorganic salts thereof and their use for controlling fungus disease in plants. The inorganic salts can be salts of copper. Exemplary preparation methods comprise isolation of compounds by crystallization or precipitation. In exemplary treatment methods, a wettable powder prepared from such compounds may then be mixed with water to obtain the required dose.

U.S. Pat. No. 5,514,200 discloses fertilizers that comprise a buffered composition of an organic acid and salts thereof and a phosphorous-containing acid and salts thereof and optionally further include copper. This patent discloses that when high concentrations of copper are used, the copper is not fully solubilized.

SUMMARY

Mixtures containing high amounts of phosphorous acid in combination with significant amounts of dissolved copper ions near neutral pH may be difficult to stabilize. Aqueous compositions comprising copper ions, phosphorous acid and/or a salt thereof and various amines were not stable at low pH (1-3). In contrast, certain compositions having a pH of from about 6-10 were stable. Stability was also observed to depend, for example, on the relative amounts of the phosphorous acid and/or the salt thereof, the copper ions and the amine in the composition as well as the identity of the amine. For example, when 24 wt % phosphorous acid and 8 wt % of basic copper carbonate were combined with 35 wt % MEA, a precipitate was observed within a few days. In contrast, formulations prepared from 18 wt % phosphorous acid and either 2 wt % or 8 wt % basic copper carbonate as the copper source were stable when an amount of 35 wt % of MEA was added to the composition. As another example, a formulation prepared from 18 wt % phosphorous acid and 2 wt % basic copper sulfate with 9 wt % potassium carbonate resulted in an immediate precipitate when only 5 wt % of 1,3-diaminopropane was used. In contrast, a formulation prepared from 18 wt % phosphorous acid and 2 wt % basic copper sulfate with 9 wt % potassium carbonate was observed to be stable for greater than one month when 11 wt % 1,3-diaminopropane was used and a formulation prepared from 18 wt % phosphorous acid and 4 wt % basic copper sulfate was stable for greater than one month when 11 wt % 1,3-diaminopropane was used. Such stability is desirable as shelf life is advantageous for commercial adoption of liquid compositions for controlling a plant disease. In the studies disclosed hereinbelow, various compositions of the present application were shown to be active against a variety of common fungal and bacterial plant pathogens.

Accordingly, the present application includes an aqueous composition for controlling a plant disease caused by a phytopathogenic organism, the composition comprising:
  (a) copper ions;
  (b) phosphorous acid and/or a salt thereof; and
  (c) an effective amount of an amine selected from an alkylamine, an alkanolamine and mixtures thereof,
  wherein the pH of the composition is from about 6 to about 10.

The present application also includes a composition of the present application prepared by a method comprising mixing the source of copper ions, the amine and optionally the alkali metal inorganic base with an aqueous solution comprising the phosphorous acid and/or the salt thereof under conditions to obtain the composition.

The present application also includes a method for controlling a plant disease caused by a phytopathogenic organism, the method comprising contacting a plant and/or the soil surrounding the plant with an effective amount of a composition of the present application.

Other features and advantages of the present application will become apparent from the following detailed description. It should be understood, however, that the detailed description and the specific examples while indicating embodiments of the application are given by way of illustration only, since various changes and modifications within the spirit and scope of the application will become apparent to those skilled in the art from this detailed description.

BRIEF DESCRIPTION OF THE DRAWINGS

The present application will now be described in greater detail with reference to the drawings in which.

DETAILED DESCRIPTION

I. Definitions

Figure 1:
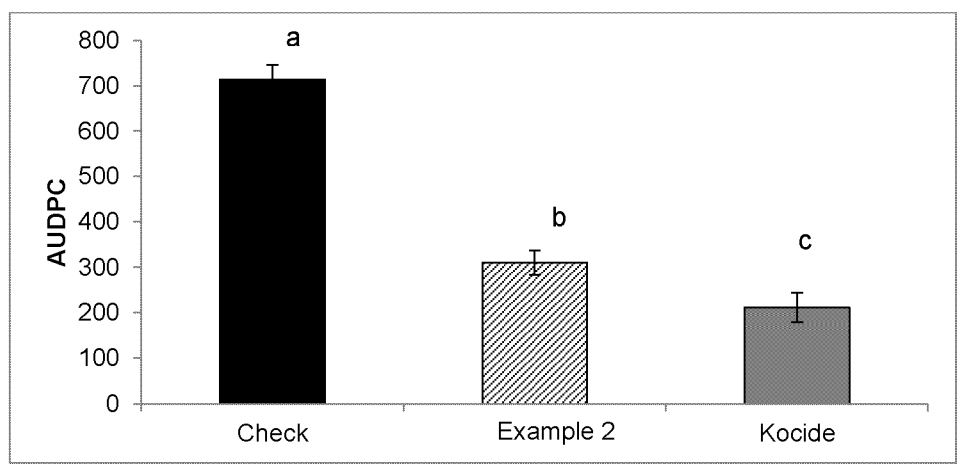
FIG. 1 is a plot showing the disease severity in terms of the area under the disease progress curve (AUDPC) for potato plants with Late Blight treated with the formulation of Example 2 (middle) in comparison to the commercially available Kocide™ (dry flowable, 35 wt % metallic copper) formulation (right) and control (left).

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

As used in this application, the singular forms "a", "an" and "the" include plural references unless the content clearly dictates otherwise. For example, an embodiment including "an alkali metal salt" should be understood to present certain aspects with one alkali metal salt or two or more additional alkali metal salts.

In embodiments comprising an "additional" or "second" component, such as an additional or second alkali metal salt, the second component as used herein is chemically different from the other components or first component. A "third" component is different from the other, first, and second components, and further enumerated or "additional" components are similarly different.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The term "basic copper sulfate" as used herein refers to a compound having the formula $(Cu_4(OH)_6(SO_4))\cdot H_2O$.

The term "basic copper carbonate" as used herein refers to a compound having the formula $Cu_2CO_3(OH)_2$.

The term "phosphorous acid" as used herein refers to a diprotic acid having the formula $H_3PO_3$ which can ionize up to two protons in aqueous solution. Phosphorous acid is a strong acid with a $pK_a$ for the first dissociation of about 1.3. The conjugate base of phosphorous acid, the hydrogen phosphite (or phosphonate) ion is a moderately weak acid and has a $pK_a$ of about 6.7. The conjugate base of the hydrogen phosphite ion, the phosphite (or phosphonate) ion does not have an acidic (readily ionizable) proton. It will be appreciated by a person skilled in the art that the relative abundance of the phosphorous acid, hydrogen phosphite ion and phosphite ion species in an aqueous solution can vary, for example, with the pH of the solution. A person skilled in the art can readily determine the relative concentrations for a given solution.

The term "effective amount" as used herein in reference to an amount of an amine means an amount, when, in combination with the desired amounts of copper ions; phosphorous acid and/or a salt thereof and optional other components in the aqueous composition stabilizes the composition such that no detectable precipitate forms for a time of at least one month, suitably greater than 6 months of storage at ambient temperature and pressure.

The term "detectable" as used herein means as observed using a visual inspection.

The term "organic acid" as used herein refers to an organic compound that is capable of donating a proton, such as a carboxylic acid.

The term "surfactant" as used herein refers to an amphiphilic compound that lowers the surface tension between two liquids and/or between a liquid and a solid; has a structure which includes a hydrophilic head group and a hydrophobic tail group; and includes anionic surfactants and cationic surfactants. The term "anionic surfactant" as used herein refers to a surfactant that contains an anionic functional group at its head such as but not limited to sulfate, sulfonate, phosphate or carboxylate. The term "cationic surfactant" as used herein refers to a surfactant that contains a cationic functional group at its head such as but not limited to a primary, secondary or tertiary amine that becomes positively charged at a pH less than 10 or a quaternary ammonium salt.

The term "micronutrient" as used herein refers to a nutrient needed in very small, or in microgram, quantities for plant growth and/or health (for example, zinc, copper, manganese, iron, molybdenum and boron).

II. Compositions and Methods of Preparation

Aqueous compositions comprising copper ions, phosphorous acid and/or a salt thereof and various amines were not stable at low pH (1-3). In contrast, certain compositions having a pH of from about 6-10 were stable. Stability was also observed to depend, for example, on the relative amounts of the phosphorous acid and/or the salt thereof, the copper ions and the amine in the composition as well as the identity of the amine.

Accordingly, the present application includes an aqueous composition for controlling a plant disease caused by a phytopathogenic organism, the composition comprising:
(a) copper ions;
(b) phosphorous acid and/or a salt thereof; and
(c) an effective amount of an amine selected from an alkylamine, an alkanolamine and mixtures thereof,
wherein the pH of the composition is from about 6 to about 10.

In an embodiment, the pH is from about 6 to about 9. In another embodiment, the pH is from about 6.5 to about 7.5.

The copper ions are present in any suitable amount that may vary, for example, depending on the amount of the phosphorous acid and/or the amount and the identity of the amine in the composition. In an embodiment, the copper ions are present in an amount of from about 0.5 wt % to about 5 wt %, based on the total weight of the composition. The copper ions are from any suitable copper source. In some embodiments, the copper ions are from a source selected from copper chloride, copper hydroxide, copper oxychloride sulfate, copper sulfate, basic copper sulfate, copper carbonate, basic copper carbonate, copper oxide, copper oxychloride and mixtures thereof. In another embodiment, the source of the copper ions is selected from basic copper sulfate, copper hydroxide and basic copper carbonate. In a further embodiment, the source of the copper ions is basic copper sulfate. It is an embodiment that the source of the copper ions is basic copper carbonate. In a further embodiment, the source of copper is copper hydroxide.

The salt of phosphorous acid can be any suitable salt. In an embodiment, the salt is an alkali metal salt of phosphorous acid. In another embodiment, the alkali metal is sodium, potassium or mixtures thereof. In a further embodiment, the salt of phosphorous acid is $K_2HPO_3$, $KNaHPO_3$, $Na_2HPO_3$, $KH_2PO_3$, $NaH_2PO_3$ or mixtures thereof. It is an embodiment that the salt of phosphorous acid is $K_2HPO_3$, $KH_2PO_3$ or mixtures thereof. In an embodiment, the salt of phosphorous acid is prepared in situ by including the phosphorous acid and an alkali metal inorganic base in the composition, wherein the amount of the alkali metal inorganic base is sufficient to form the alkali metal salt of the phosphorous acid and to provide a pH of about 6 to about 10. In some embodiments, the alkali metal inorganic base is selected from potassium carbonate, sodium carbonate, potassium bicarbonate, sodium bicarbonate, potassium hydroxide, sodium hydroxide or mixtures thereof. In some embodiments, the alkali metal inorganic base is potassium carbonate.

The phosphorous acid and/or the salt thereof is present in any suitable amount and may vary, for example, depending on the amount of the copper ions and/or the amount of the amine in the composition. In some embodiments, the phosphorous acid and/or the salt thereof is present in an amount of from about 10 wt % to about 30 wt %, based on the total weight of the composition. In another embodiment, the phosphorous acid and/or the salt thereof is present in an amount of from about 12 wt % to about 24 wt %, about 18 wt % to about 24 wt %, about 18 wt % or about 24 wt %, based on the total weight of the composition.

The amine is selected from any suitable alkylamine, any suitable alkanolamine or any suitable mixture thereof. For example, triethyl amine has not been observed to improve the stability of any formulation therefore would not be understood by a person skilled in the art to be a suitable alkylamine. Accordingly, in some embodiments, the alkylamine comprises at least one primary amine group. In some embodiments, the alkylamine is selected from propylamine, ethylenediamine, 1,3-diaminopropane, diethylenetriamine, triethylenetetramine, polymeric amines and mixtures thereof. In another embodiment of the present application, the alkylamine is selected from ethylenediamine, 1,3-diaminopropane, diethylenetriamine, triethylenetetramine and mixtures thereof. In a further embodiment, the alkylamine is a mixture of ethylenediamine and triethylenetetramine. It is an embodiment that the alkylamine is diethylenetriamine. In another embodiment, the alkylamine is triethylenetetramine. In a further embodiment, the alkylamine is 1,3-diaminopropane. In some embodiments, the alkanolamine is selected from monoethanolamine (MEA), diethanolamine (DEA), triethanolamine (TEA) and mixtures thereof. In another embodiment, the alkanolamine is MEA.

In an embodiment, the phosphorous acid and/or the salt thereof is present in an amount of about 20 wt % to about 30 wt %, about 22 wt % to about 26 wt %, or about 24 wt %, based on the total weight of the composition; and the amine is diethylenetriamine present in an amount greater than 4 wt % and less than 21 wt %, about 6 wt % to about 15 wt %, or about 7 wt % to about 11 wt %, based on the total weight of the composition. In another embodiment of the present application, the diethylenetriamine is present in an amount of about 9 wt %, based on the total weight of the composition.

In an embodiment, the phosphorous acid and/or the salt thereof is present in an amount of about 20 wt % to about 30 wt %, about 22 wt % to about 26 wt %, or about 24 wt %, based on the total weight of the composition; and the amine is 1,3-diaminopropane present in an amount of greater than 7 wt % and less than 15 wt %, or about 10 wt % to about 15 wt %, based on the total weight of the composition. In another embodiment, the 1,3-diaminopropane is present in an amount of about 13 wt %, based on the total weight of the composition.

In an embodiment, the phosphorous acid and/or the salt thereof is present in an amount of about 20 wt % to about 30 wt %, about 22 wt % to about 26 wt %, or about 24 wt %, based on the total weight of the composition; and the amine is triethylenetetramine present in an amount of about 8 wt % to about 20 wt %, or greater than 10 wt % and less than 17 wt %, based on the total weight of the composition. In another embodiment, the triethylenetetramine is present in an amount of about 14 wt %, based on the total weight of the composition.

In an embodiment, the phosphorous acid and/or the salt thereof is present in an amount of about 12 wt % to about 20 wt %, about 15 wt % to about 19 wt %, or about 18 wt %, based on the total weight of the composition; and the amine is monoethanolamine (MEA) present in an amount of greater than 25 wt % and less than 40 wt %, or about 30 wt % to about 38 wt %, based on the total weight of the composition. In another embodiment, the MEA is present in an amount of about 35 wt %, based on the total weight of the composition.

In an embodiment, the composition comprises about 20 wt % to about 30 wt %, about 22 wt % to about 26 wt %, or about 24 wt %, phosphorous acid and/or the salt thereof; about 1 wt % to about 3 wt %, or about 2 wt %, of basic copper carbonate; about 10 wt % to about 17 wt %, or about 14 wt %, triethylenetetramine; and about 8 wt % to about 15 wt %, or about 11 wt %, potassium carbonate, based on the total weight of the composition.

In an embodiment, the composition comprises about 15 wt % to about 20 wt %, or about 18 wt %, phosphorus acid and/or the salt thereof, about 1 wt % to about 3 wt %, or about 2 wt % of copper hydroxide and about 10 wt % to about 15 wt %, or about 11 wt % of an amine selected from an alkyl amine and an alkanol amine, for example ethylenediamine, based on the total weight of the composition.

The compositions of the present application optionally include further components. For example, inorganic bases such as an alkali metal hydroxide (e.g. potassium or sodium hydroxide), an alkali metal carbonate (e.g. potassium or sodium carbonate) or an alkali metal bicarbonate (e.g. sodium or potassium bicarbonate) can be used in combination with the amine to provide a composition with a desired pH and/or to form salts with the phosphorous acid. Accordingly, in some embodiments, the composition further comprises an alkali metal inorganic base such as but not limited to potassium carbonate, sodium carbonate, potassium bicarbonate, sodium bicarbonate, potassium hydroxide, sodium hydroxide or mixtures thereof. In another embodiment, the alkali metal inorganic base is potassium carbonate.

In some embodiments, the compositions of the present application further include one or more additional acids (for example inorganic acids such as phosphoric acid or organic acids such as acetic acid), surfactants (such as suitable anionic or cationic surfactants) and/or micronutrients (such as boron, chlorine, iron, manganese, molybdenum, zinc or mixtures thereof).

In an embodiment, the surfactant is a cationic surfactant. In another embodiment of the present application, the cationic surfactant is cetyltrimethylammonium chloride. The surfactant is present in any suitable amount. In an embodiment, the surfactant is present in an amount of about 0.01 wt % to about 0.1 wt % or about 0.03 wt %, based on the total weight of the composition.

In some embodiments, the composition is prepared by a method comprising mixing the source of copper ions, the amine and optionally, the further components with an aqueous solution comprising the phosphorous acid and/or the salt thereof under conditions to obtain the composition.

Accordingly, the present application also includes an aqueous composition for controlling a plant disease caused by a phytopathogenic organism, the composition prepared by a method comprising mixing a source of copper ions, an amine selected from an alkylamine and an alkanolamine and optionally an alkali metal salt with an aqueous solution comprising phosphorous acid and/or a salt thereof under conditions to obtain the composition.

In some embodiments, the conditions to obtain the composition comprise adding the desired amount of the phosphorous acid and/or the salt thereof to water and stirring for a time until the phosphorous acid is dissolved, adding the desired amount of the source of copper ions to the aqueous solution comprising the phosphorous acid and/or the salt thereof, followed by the amine, and optionally a further base and/or acid until the desired pH is obtained, and optionally adding further components to obtain the composition.

In some embodiments, each addition is stirred for a time and at a temperature (e.g. ambient temperature or about 18° C. to about 23° C.) until the mixture is dissolved or well dispersed before the next component is added.

III. Methods for Controlling Plant Diseases and Uses

In the studies disclosed herein below, various compositions of the present application were shown to be active against a variety of common fungal and bacterial plant pathogens.

Accordingly, the present application also includes a method for controlling a plant disease caused by a phytopathogenic organism, the method comprising contacting a plant and/or the soil surrounding the plant with an effective amount of a composition of the present application.

The present application further includes a use of a composition of the present application on a plant and/or the soil surrounding the plant for controlling a plant disease caused by a phytopathogenic organism as well as a composition of the present application for use to control a plant disease caused by a phytopathogenic organism on a plant and/or the soil surrounding the plant.

As used herein, the term "effective amount" as used herein when referring to a method for controlling a plant disease caused by a phytopathogenic organism means an amount of the composition of the present application that is effective, at rates of administration or use and for periods of time necessary to achieve the desired result. For example in the context of controlling the plant disease, an effective amount is an amount that, for example, decreases the disease severity in comparison to the disease severity without the administration or use of the composition of the present application. In an embodiment, effective amounts vary according to factors such as the plant disease and/or identity of the plant, but can nevertheless be routinely determined by one skilled in the art.

Methods for controlling a plant disease or uses comprise contacting the plant and/or the soil surrounding the plant with an effective amount of a composition of the application, optionally consisting of a single administration or use, or alternatively comprising a series of administrations or uses. For example, the composition of the application is administered at least once a week. However, in another embodiment, the plant and/or the soil surrounding the plant is contacted with the composition of the application from about one time per three weeks, or about one time per week to about once daily for a given treatment. The length of the treatment period depends on a variety of factors, such as the identity of the plant disease, the severity of the plant disease, the identity and/or the age of the plant, the concentration of the composition of the application and/or a combination thereof. It will also be appreciated that the effective amount of a composition of the application used for the administration or use may increase or decrease over the course of a particular regime. In some instances, chronic administration or use is required. For example, the composition of the application is administered or used in an amount and for a duration sufficient to control the plant disease caused by the phytopathogenic organism.

The compositions of the present application are for use in any suitable rate, the selection of which can be made by a person skilled in the art. In some embodiments, the compositions of the present application are for use in a rate of from about 1 L/acre to about 3 L/acre (about 2.5 L/Ha to about 7.5 L/Ha) in about 40 to about 300 L of water. In another embodiment, the compositions of the present application are for use in a rate of about 1 L/acre (about 2.5 L/Ha) in about 40 to about 300 L of water.

In some embodiments, the phytopathogenic organism is a phytopathogenic fungus, bacterium, alga or virus.

In an embodiment, the phytopathogenic organism is a phytopathogenic fungus. In an embodiment, the phytopathogenic organism is a phytopathogenic fungus selected from Basidiomycetes, Ascomycetes, Deuteromycetes, Zygomycetes and Oomycetes. In another embodiment, the phytopathogenic fungus is selected from *Alternaria* spp., *Anisogramma anomala*, *Ascochyta* spp., *Blumeria graminis*, *Blumeriella Botryosphaeria* spp., *Botrytis* spp., *Cercospora* spp., *Cochliobolus* spp., *Colletotrichum* spp., *Cristulariella depraedans*, *Didymella bryoniae*, *Elsinoe* spp., *Erysiphe* spp., *Fusarium* spp., *Guignardia* spp., *Helminthosporium* spp., *Leptosphaerulina* spp., *Leveillua taurica*, *Monilinia* spp., *Mycosphaerella* spp., *Neonectria* spp., *Pseudopeziza* spp., *Pezicula* spp., *Phaeosphaeria* spp., *Phomopsis* spp., *Phyllachora* spp., *Podosphaera* spp., *Sclerotinia* spp., *Septocyta ruborum*, *Septoria* spp. (*Mycosphaerella* spp.), *Taphrina* spp., *Ulocladium* spp., *Venturia* spp., *Wilsonomyces carophilus*, *Erythricium* spp., *Exobasidium* spp., *Gymnosporangium* spp., *Hemileia vastatrix*, *Phoma* spp., *Phragmidium* spp., *Rhizoctonia* spp., *Puccinia* spp., *Mucor* spp., *Ustilago* spp., *Tilletia* spp., *Uromyces* spp., *Phakopsora* spp., *Sphaerotheca* spp., *Uncinula* spp., *Rhynchosporium* spp., *Pyrenophora* spp., *Cercosporella herpotrichoides*, *Pyricularia oryzae*, *Sclerotium* spp. (*Typhula* spp.), *Albugo* spp., *Phytophthora* spp., *Pythium* spp., *Plasmopara viticola*, *Peronospora* spp., *Pseudoperonospora cubensis*, *Sclerophthora* spp., *Spilocaea oleaginea* and *Bremia lactucae*.

In an embodiment, the phytopathogenic organism is a phytopathogenic bacterium. In another embodiment, the phytopathogenic organism is a phytopathogenic bacterium selected from *Xanthomonas* spp., *Pseudomonas* spp., *Pantoea* spp., *Erwinia amylovora* and *Acidovorax* spp.

In a further embodiment, the phytopathogenic organism is a phytopathogenic virus. In another embodiment of the present application, the phytopathogenic organism is tobacco mosaic virus (TMV).

In an embodiment, the phytopathogenic organism is a phytopathogenic green alga. In another embodiment, the phytopathogenic green alga is selected from *Cephaleuros* spp.

In an embodiment, the plant is selected from cereals, fruit plants, nut trees, citrus trees, legumes, tubers, vegetables, cucurbitaceae, oleaginous plants, tobacco, coffee, tea, cocoa, sugar beet, sugar cane, herbs, hops, ginseng, grasses and cotton. In another embodiment:

the cereals are selected from wheat, barley, rye, oats, rice, maize and sorghum;

the fruit plants are selected from almond, apples, avocado, pears, plums, peaches, cherries, bananas, grapes, strawberries, cranberries, apricots, nectarines, kiwis, mangos, pineapples, olives, blueberries and cane berries (e.g. raspberries or blackberries);

the nut trees are selected from pistachio, walnut and pecan;

the citrus trees are selected from oranges, lemons, mandarins and grapefruit;

the legumes are selected from beans, peas, lentils and soybean;

the tubers are selected from potatoes, beets and sugar beets;

the vegetables are selected from leafy greens (e.g. spinach or lettuce), asparagus, celery, brassica (e.g. cabbage, broccoli, cauliflower, Brussels sprouts or mustard), carrots, onions, tomatoes, eggplants, garlic and peppers;

the cucurbitaceae are selected from squash, pumpkins, zucchini, cucumbers, melons and watermelons;

the herbs are selected from chives and dill;

the grass is alfalfa; and the oleaginous plants are selected from sunflower, rapeseed, canola, peanut, castor and coconut.

The following non-limiting examples are illustrative of the present application:

EXAMPLES

Examples 1-16

Formulations

I. Materials and Methods

General Procedure: Water was added to a vessel then the desired amount of phosphorous acid was added and stirring continued until completely dissolved. Once fully dissolved, the desired amount of the copper source was added, followed by the amine until the desired pH was obtained. A further base or acid was optionally added to adjust the pH to the desired range. Table 1 lists the compositions of various formulations which were tested.

II. Results and Discussion

As can be seen from Examples 1-4 in Table 1, various formulations wherein the amine was MEA were observed to be stable for greater than 6 months. For example, formulations prepared from 18 wt % phosphorous acid and either 2 wt % or 8 wt % basic copper carbonate as the copper source were stable when an amount of 35 wt % of MEA was added to the composition. In contrast, when 24 wt % phosphorous acid and 8 wt % of basic copper carbonate were combined with 35 wt % MEA, a precipitate was observed within a few days.

As another example, a formulation prepared from 24 wt % phosphorous acid, 2 wt % basic copper carbonate as the copper source and 11 wt % potassium carbonate was observed to be stable for greater than one month when 9 wt % diethylenetriamine was used but resulted in an immediate precipitate when only 4 wt % of the diethylenetriamine was used and a precipitate after a few days when 21 wt % of diethylenetriamine was used.

Formulations prepared from 18 wt % phosphorous acid, 2 wt % basic copper carbonate as the copper source and either 7 wt % triethylenetetramine and 8 wt % potassium carbonate (with or without 0.03% cetyltrimethylammonium chloride) or 14 wt % triethylenetetramine were stable for over 6 months. Formulations prepared from 24 wt % phosphorous acid, 2 wt % basic copper carbonate or 2 wt % basic copper sulfate as the copper source and 11 wt % potassium carbonate were stable for greater than 5 or 6 months when 14 wt % triethylenetetramine was used. In contrast, when 24 wt % phosphorous acid, 2 wt % basic copper carbonate as the copper source, 11 wt % potassium carbonate and 10 wt % or 17 wt % triethylenetetramine was used, the formulations were found to be unstable and a precipitate formed overnight/within a few days.

A formulation prepared from 18 wt % phosphorous acid and 2 wt % basic copper sulfate with 9 wt % potassium carbonate was observed to be stable for greater than one month when 11 wt % 1,3-diaminopropane was used. Similarly, a formulation prepared from 18 wt % phosphorous acid and 4 wt % basic copper sulfate was stable for greater than one month when 11 wt % 1,3-diaminopropane was used. In contrast, a formulation prepared from 18 wt % phosphorous acid and 2 wt % basic copper sulfate with 9 wt % potassium carbonate resulted in an immediate precipitate when only 5 wt % of 1,3-diaminopropane was used.

As another example, a formulation prepared from 24 wt % phosphorous acid, 2 wt % basic copper sulfate with 9 wt % potassium carbonate was stable for greater than 2 months when 13 wt % 1,3-diaminopropane was used. When 7 or 15 wt % 1,3-diaminopropane was used with 24 wt % phosphorous acid, 2 wt % basic copper sulfate and 9 wt % potassium carbonate the formulations precipitated within 24 hours. When basic copper carbonate was used as the copper source, at 7 wt % amine the formulation was unstable and at 21 wt % amine the formulation was observed to be gel like.

As another example, a formulation prepared from 18 wt % phosphorous acid, 1.6 wt % copper hydroxide with 8.4 wt % potassium carbonate was stable for greater than 1 week when 11 wt % ethylenediamine was used.

When ammonium hydroxide was used as the amine, a formulation prepared from 24 wt % phosphorous acid, 2 wt % basic copper carbonate, 33 wt % amine and 11 wt % potassium carbonate was stable for a few months before a precipitate was observed. All other formulations tested using ammonium hydroxide as the amine were observed to result in a precipitate within a few days.

Example 17

Treatment of Late Blight Disease in Potatoes

I. Materials and Methods

The trial was conducted in a randomized complete block design (RCBD) in a field setting. 5 applications were made; on Aug. 10, Aug. 18, Aug. 25, Sep. 3 and Sep. 12, 2015. Assessments were made on Aug. 18, Aug. 25, Sep. 3 and Sep. 12, 2015 to determine disease pressure and phytotoxicity.

Treatments: Check (control; no treatment applied), Kocide™ 2000 (1 kg/Ha), Example 2 (2.5 L/Ha). 200 L/Ha spray volume.

II. Results and Discussion

FIG. 1 shows the disease severity in terms of the area under the disease progress curve (AUDPC) for potato plants with Late Blight (caused by the fungus-like oomycete *Phytophthora infestans*) treated with the formulation of Example 2 (middle) in comparison to the commercially available Kocide formulation (right) and control (left). As can be seen from FIG. 1, the potato plants treated with the formulation of Example 2 had a disease severity of Late Blight which was significantly less than that of the control. There was seen to be some phytotoxicity (10%) with the Kocide treatment and to a much lesser extent a small amount of leaf curl was seen with the Example 2 formulation.

Example 18

Treatment of Powdery Mildew in Cucumber

I. Materials and Methods

The trial was conducted in a RCBD in a greenhouse. Seeds were planted February 4. Applications were made weekly starting when the plants were 8 inches tall (Feb. 24, and Mar. 3, 13, and 21, 2014). Assessments were made on Mar. 13, 23, and 31, 2014 to determine disease pressure.

Treatments: Check (control; no treatment applied), Example 2 (2.5 L/Ha), Sulfur (Microthiol™ at 2.25 kg/Ha).

II. Results and Discussion

Figure 2:
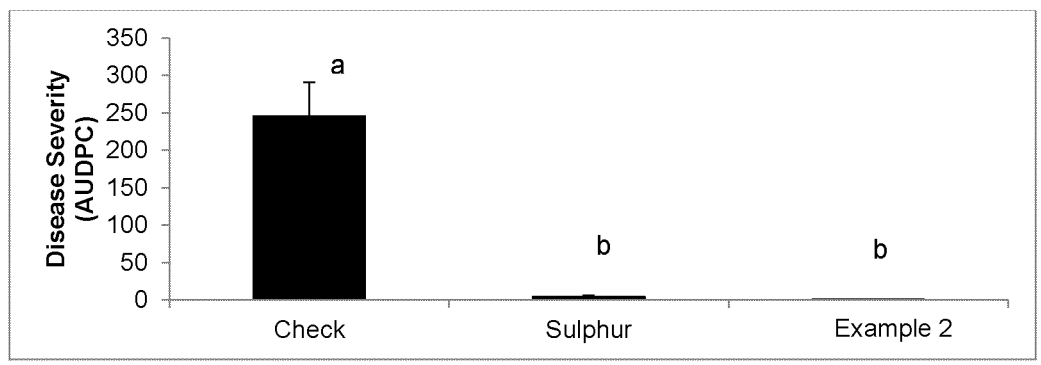
FIG. 2 is a plot showing the disease severity in terms of AUDPC for cucumber plants with Powdery Mildew treated with the formulation of Example 2 (right) in comparison to a commercially available sulphur formulation (middle) and control (left).

FIG. 2 shows the disease severity in terms of the AUDPC for cucumber plants with powdery mildew (caused by the fungus *Podosphaera xanthii*) treated with the formulation of Example 2 (right) in comparison to the commercially available Microthiol sulphur formulation (middle) and control (left). As can be seen from FIG. 2, the cucumber plants treated with the formulation of Example 2 had an AUDPC of approximately zero.

Example 19

Treatment of Bacterial Speck and Spot in Tomatoes

I. Materials and Methods

The trial was conducted in a RCBD in a field setting. 4 applications were made on Jun. 19, Jun. 26, Jul. 3, and Jul. 10, 2016. Assessments were made on Jun. 19, Jun. 26, Jul. 3, and Jul. 10, 2016 to determine disease pressure and phytotoxicity.

Treatments: Check (control; no treatment applied), Examples 2 and 3 were applied at 2.5 L/Ha, Kocide was applied at 1 kg/Ha. 200 L/Ha spray volume.

II. Results and Discussion

Figure 3:
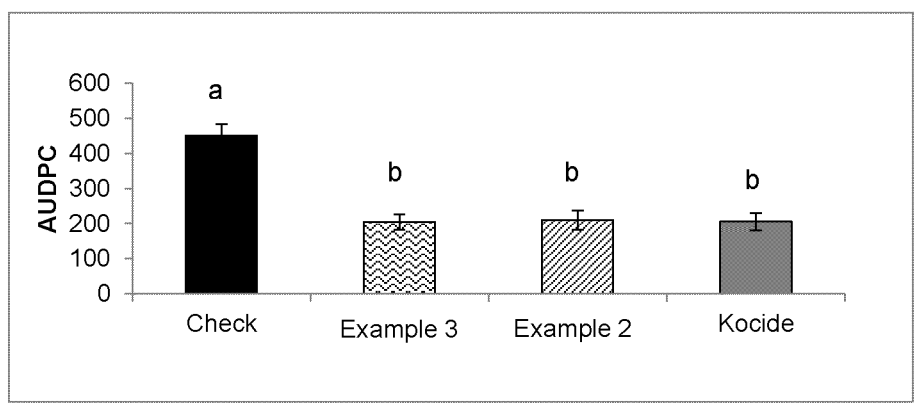
FIG. 3 is a plot showing the disease severity in terms of AUDPC for tomato (var. Lunchbox) plants with Bacterial Speck and Spot treated with the formulations of Example 3 (second from left) and Example 2 (second from right) in comparison to the commercially available Kocide formulation (far right) and control (far left).

FIG. 3 shows the disease severity in terms of AUDPC for tomato (var. Lunchbox) plants with Bacterial Speck (caused by the bacterium *Pseudomonas syringae* pv. tomato) and Spot (caused by the bacterium *Xanthomonas campesiris* pv., *vesicatoria*) treated with the formulations of Example 3 (second from left) and Example 2 (second from right) in comparison to the commercially available Kocide formulation (far right) and control (far left). As can be seen from FIG. 3, tomato plants treated with the formulations of Example 2 and Example 3 had a disease severity of Bacterial Speck and Spot which was significantly less than that of the control. All treatments had less than 5% incidence of phytotoxicity.

Example 20

Treatment of Downy Mildew in Cucumbers

I. Materials and Methods

The trial was conducted in a RCBD in a greenhouse. 5 applications of spray were made on Nov. 27, Dec. 4, Dec. 11, Dec. 18 and Dec. 25, 2016. Assessments were made on Dec. 4, Dec. 11, Dec. 18, Dec. 25 and Dec. 29, 2014 for disease pressure and phytotoxicity.

Treatments: Check (control; no treatment applied), Phostrol™ (1 L/Ha), Examples 7, 9 and 10 (2.5 L/Ha). 100 L/Ha spray volume.

II. Results and Discussion

Figure 4:
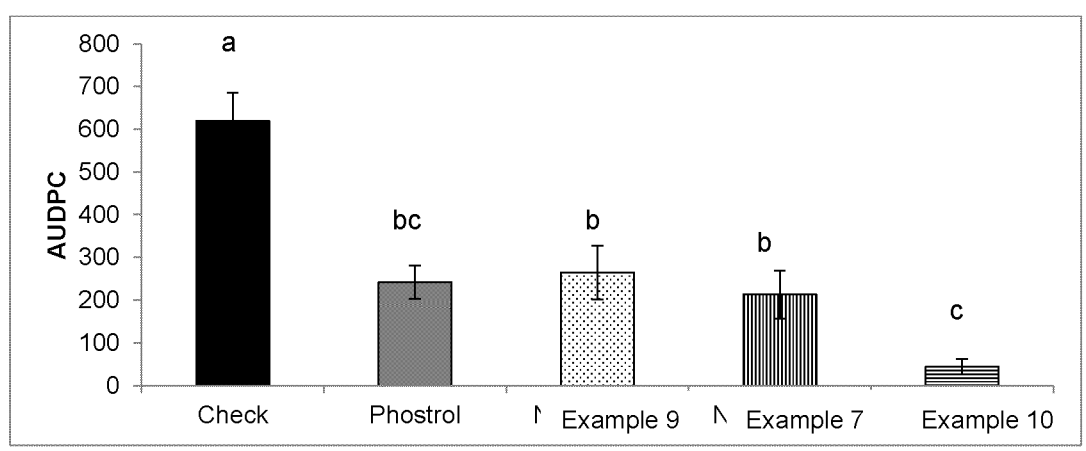
FIG. 4 is a plot showing the disease severity in terms of AUDPC for cucumber plants (var. Howden) with Downy Mildew treated with the formulations of Example 9 (middle), Example 7 (second from right) and Example 10 (far right) in comparison to the commercially available Phostrol™ (53 wt % mono- and dibasic sodium, potassium, and ammonium phosphites) formulation (second from left) and control (far left).

FIG. 4 shows the disease severity in terms of AUDPC for cucumber plants (var. Howden) with Downy Mildew (caused by the fungus-like oomycete *Pseudoperonospora cubensis* treated with the formulations of Example 9 (middle), Example 7 (second from right) and Example 10 (far right) in comparison to the commercially available Phostrol™ formulation (second from left) and control (far left). As can be seen from FIG. 4, cucumber plants treated with the formulations of Examples 7, 9 and 10 had a disease severity of Downy Mildew which was significantly less than that of the control, the formulation of Example 10 having the lowest level for disease severity of all formulations tested. The phytotoxicity was found to be 9.7% for Phostrol and 0% for Example 10, the latter being indistinguishable from the control.

Example 21

Treatment of Bacterial Speck and Spot in Tomatoes

I. Materials and Methods

The trial was conducted in the Greenhouse. 5 applications were made on Nov. 27, Dec. 4, Dec. 11, Dec. 18 and Dec. 25, 2014. Assessments were made on Dec. 4, Dec. 11, Dec. 18, and Dec. 25, 2014 to determine disease pressure and phytotoxicity.

Treatment: Check (control; no treatment applied), Kocide (2.52 kg/Ha), Examples 2, 7, 9 and 10 (2.5 L/Ha). 200 L/Ha spray volume.

II. Results and Discussion

Figure 5:
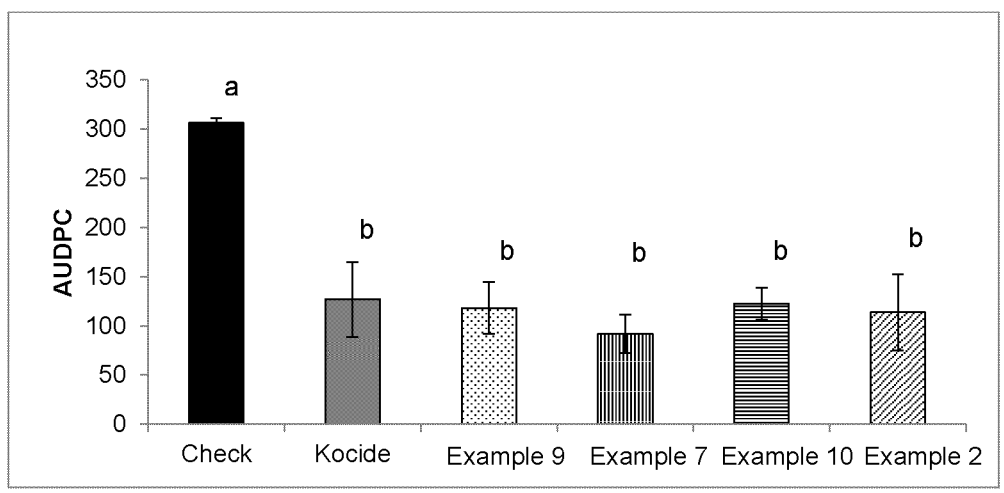
FIG. 5 is a plot showing the disease severity in terms of AUDPC for tomato plants with Bacterial Speck and Spot treated with the formulations of Example 9 (third from left), Example 7 (third from right), Example 10 (second from right) and Example 2 (far right) in comparison to the commercially available Kocide formulation (second from left) and control (far left).

FIG. 5 shows the disease severity in terms of AUDPC for tomato plants with Bacterial Speck and Spot treated with the formulations of Example 9 (third from left), Example 7 (third from right), Example 10 (second from right) and Example 2 (far right) in comparison to the commercially available Kocide formulation (second from left) and control (far left). As can be seen from FIG. 5, tomato plants treated with the formulations of Examples 2, 7, 9 and 10 had a disease severity of Bacterial Speck and Spot which was significantly less than that of the control, the formulation of Example 7 having the lowest level for disease severity of all formulations tested. Kocide had 3.8% phytotoxicity, Example 2 was lower at 1.3% and Examples 7, 9 and 10 had no phytotoxicity.

Example 22: Treatment of Early Blight in Tomatoes

I. Materials and Methods

The trial was conducted in a RCBD in a field setting. 5 applications were made on Aug. 4, Aug. 11, Aug. 18, Aug. 24, and Sep. 1, 2014. Assessments were made on Aug. 8, Aug. 15, Aug. 22, Aug. 29, and Sep. 5, 2014 to determine disease pressure and toxicity.

Treatments: Check (control; no treatment applied), Kocide 3000 (2.5 kg/Ha), Example 2 (2.5 L/Ha). 200 L/Ha spray volume.

II. Results and Discussion

Figure 6:
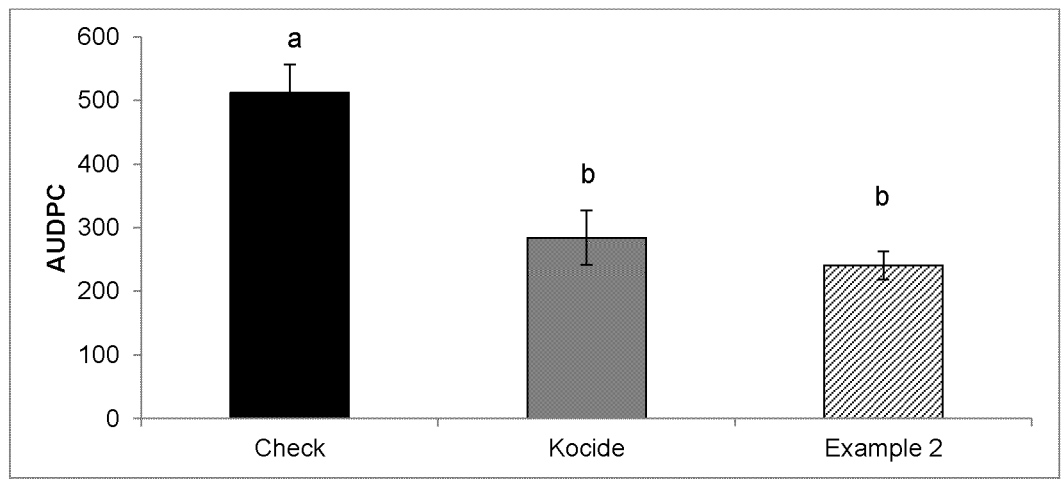
FIG. 6 is a plot showing the disease severity in terms of AUDPC for tomato plants with Early Blight treated with the formulations of Example 2 (right) in comparison to the commercially available Kocide formulation (middle) and control (left).

FIG. 6 shows the disease severity in terms of AUDPC for tomato plants with Early Blight (caused by the fungus *Alternaria solani*) treated with the formulations of Example 2 (right), in comparison to the commercially available Kocide formulation (middle) and control (left). As can be seen from FIG. 6, tomato plants treated with the formulation of Example 2 had a disease severity of Early Blight which was significantly less than that of the control. No phytotoxicity was seen in any treatment.

Example 23

Treatment of Downy Mildew in Grapes

I. Materials and Methods

The trial was conducted in a RCBD in a field setting. 5 applications were made on Jun. 24, Jul. 2, Jul. 16, Jul. 24, and Aug. 8, 2015. Assessments were made on Jun. 24, Jul. 2, Jul. 16, Jul. 24, Aug. 8, Aug. 18, Aug. 28, and Sep. 15, 2015 to determine disease pressure and yield.

Treatments: Check (control; no treatment applied), Captan (1 kg/Ha), Example 10 (2.5 L/Ha), Example 10 (1.25 L/Ha). 800 L/Ha spray volume.

II. Results and Discussion

Figure 7:
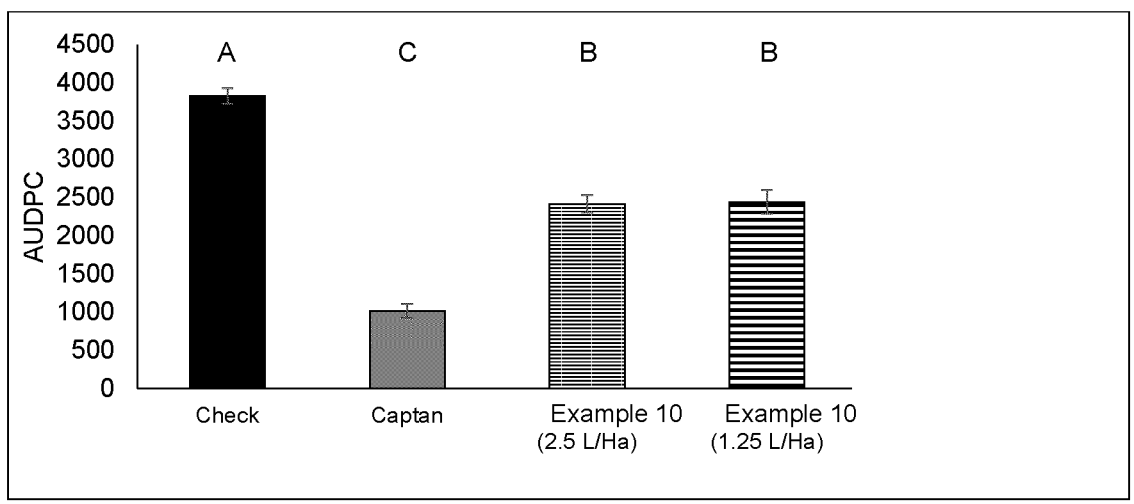
FIG. 7 is a plot showing the disease severity in terms of AUDPC for grapes with Downy Mildew treated with the formulations of Example 10 at rates of 2.5 L/Ha (second from right) and 1.25 L/Ha (far right) in comparison to the commercially available Captan™ formulation (second from left) and control (far left).

FIG. 7 shows the disease severity in terms of AUDPC for grapes with Downy Mildew (caused by the fungus-like oomycete *Plasmopara viticola*) treated with the formulation of Example 10 at rates of 2.5 L/Ha (second from right) and 1.25 L/Ha (far right) in comparison to the commercially available Captan™ formulation (second from left) and control (far left). As can be seen from FIG. 7, cucumber plants treated with the formulations of Example 10 had disease severity of Downy Mildew which was significantly less than that of the control. There was no difference in yield among all treatments.

While the present application has been described with reference to what are presently considered to be the preferred examples, it is to be understood that the application is not limited to the disclosed examples. To the contrary, the present application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

| | | Copper | | Amine | | | | | |
|---|---|---|---|---|---|---|---|---|---|
| No. | $H_3PO_3$ (wt %) | Source | Amt wt % | Identity | Amt wt % | $K_2CO_3$ (wt %) | $H_2O$ wt % | Total % | pH | Stability |
| 1 | 12 | basic carbonate | 7 | MEA | 30 | — | 51 | 100 | 9.9 | >6 months |
| 2 | 18 | basic carbonate | 2 | MEA | 35 | — | 45 | 100 | 10.1 | >6 months |
| 3 | 18 | basic carbonate | 8 | MEA | 35 | — | 39 | 100 | 9.5 | >6 months |

TABLE 1-continued

| No. | H$_3$PO$_3$ (wt %) | Copper Source | Amt wt % | Amine Identity | Amt wt % | K$_2$CO$_3$ (wt %) | H$_2$O wt % | Total % | pH | Stability |
|---|---|---|---|---|---|---|---|---|---|---|
| 4 | 18 | sulfate | 4 | MEA | 35 | — | 43 | 100 | 9.7 | >6 months |
| Comp Ex. 1 | 24 | basic carbonate | 8 | MEA | 35 | — | 33 | 100 | 8.8 | ppt within a few days |
| 5 | 24 | basic carbonate | 2 | EDTEA | 82 | 9 | 55 | 100 | 6.9 | >6 months |
| Comp Ex. 2 | 24 | basic carbonate | 2 | DETA | 4 | 11 | 59 | 100 | ND* | immediate ppt |
| 6 | 24 | basic carbonate | 2 | DETA | 9 | 11 | 54 | 100 | 6.4 | >1 month |
| Comp Ex. 3 | 24 | basic carbonate | 2 | DETA | 21 | 11 | 42 | 100 | 9.9 | ppt after a few days |
| 7 | 18 | basic carbonate | 2 | TETA | 7 | 8 | 65 | 100 | 6.7 | >6 months |
| 8 | 18 | basic carbonate | 2 | TETA | 7 | 8 | 65 | 100*** | 6.7 | >6 months |
| 9 | 18 | basic carbonate | 2 | TETA | 14 | — | 66 | 100 | 7.1 | >6 months |
| Comp Ex. 4 | 24 | basic carbonate | 2 | TETA | 10 | 11 | 53 | 100 | 6.2 | ppt after a few days |
| 10 | 24 | basic carbonate | 2 | TETA | 14 | 11 | 49 | 100 | 6.6 | >6 months |
| 11 | 24 | basic sulfate | 2 | TETA | 14 | 11 | 49 | 100 | 6.6 | >5 months |
| Comp Ex. 5 | 24 | basic carbonate | 2 | TETA | 17 | 11 | 46 | 100 | 7.5 | ppt overnight |
| 12 | 18 | basic sulfate | 2 | DAP | 5 | 9 | 66 | 100 | ND* | immediate ppt |
| 13 | 18 | basic sulfate | 2 | DAP | 11 | 9 | 60 | 100 | 7.8 | >1 month |
| 14 | 18 | basic sulfate | 4 | DAP | 11 | — | 67 | 100 | 6.5 | >1 month |
| Comp Ex. 6 | 24 | basic carbonate | 2 | DAP | 7 | 9 | 58 | 100 | ND* | immediate ppt |
| Comp Ex. 7 | 24 | basic sulfate | 2 | DAP | 7 | 9 | 58 | 100 | 6.8 | ppt after 1 day |
| 15 | 24 | basic sulfate | 2 | DAP | 13 | 9 | 52 | 100 | 7.6 | >2 months |
| Comp Ex. 8 | 24 | basic sulfate | 2 | DAP | 15 | 9 | 50 | 100 | ND* | immediate ppt |
| Comp Ex. 9 | 24 | basic carbonate | 2 | DAP | 21 | 9 | 44 | 100 | ND* | gel like |
| Comp Ex. 10 | 24 | basic carbonate | 2 | NH$_4$OH | 11 | 11 | 52 | 100 | ND* | immediate ppt |
| Comp Ex. 11 | 24 | basic carbonate | 2 | NH$_4$OH | 22 | 11 | 41 | 100 | 6.7 | ppt after 3 days |
| Comp Ex. 12 | 24 | basic carbonate | 2 | NH$_4$OH | 26 | 11 | 33 | 100** | 7.5 | ppt after 2 days |
| Comp Ex. 13 | 24 | basic sulfate | 2 | NH$_4$OH | 26 | 11 | 33 | 100** | 6.6 | ppt after 1 day |
| 16 | 24 | basic carbonate | 2 | NH$_4$OH | 33 | 11 | 30 | 100 | 7.8 | ppt after a few months |
| Comp Ex. 14 | 24 | sulfate | 4 | NH$_4$OH | 33 | 11 | 28 | 100 | ND* | immediate ppt |
| Comp Ex. 15 | 28 | basic carbonate | 7 | — | — | — | 65 | 100 | 1.1 | ppt after 2 days |
| 17 | 18 | copper hydroxide | 1.6 | EDA | 11 | 8.4 | 61 | 100 | 7.17 | no ppt after 1 week |

*not determined
**also contains 4 wt % acetic acid
***also contains 0.03% cetyltrimethylammonium chloride
EDTEA = ethylene diamine triethylenetetramine
DETA = diethylenetriamine
TETA = triethylenetetramine
DAP = 1,3-diaminopropane
EDA = ethylene diamine

The invention claimed is:

1. An aqueous composition for controlling a plant disease caused by a phytopathogenic organism, the composition comprising:
   (a) copper ions;
   (b) phosphorous acid and/or a salt thereof; and
   (c) an alkylamine,
   wherein the aqueous composition is prepared by combining a source of copper ions in an amount of from about 0.5 wt % to about 5 wt %;
   the phosphorous acid in an amount of about 24 wt %, and an effective amount of the alkylamine,
   wherein
      the alkylamine is triethylenetetramine and the effective amount of the triethylenetetramine is about 12 wt % to less than 17 wt %, or
      the alkylamine is diethylenetriamine and the effective amount of the diethylenetriamine is about 9 wt % to about 17 wt %, or
      the alkylamine is 1,3-diaminopropane and the effective amount of the 1,3-diaminopropane is greater than 12 wt % and less than 15 wt %; and
      the pH of the composition is from about 6 to about 10, and all wt % are based on the total weight of the composition, and
   wherein the aqueous composition is a stable aqueous composition such that no detectable precipitate forms for a time of at least one month of storage at ambient temperature and pressure.

2. The composition of claim 1, wherein the composition is prepared by further combining the source of copper ions, the phosphorus acid and alkylamine with an alkali metal inorganic base.

3. The composition of claim 1, wherein:
   the alkylamine is 1,3-diaminopropane and the effective amount of the 1,3-diaminopropane is about 13 wt % to about 14 wt %, based on the total weight of the composition.

4. The composition of claim 1, wherein:
   the alkylamine is triethylenetetramine and the effective amount of the triethylenetetramine is about 12 wt % to about 15 wt %, based on the total weight of the composition.

5. The composition of claim 1, wherein
   the alkylamine is diethylenetriamine and the effective amount of the diethylenetriamine is about 9 wt % to about 17 wt %, based on the total weight of the composition, and wherein the phosphorus acid and the diethylenetriamine are further combined with about 11 wt % to about 12 wt %, based on the total weight of the composition, of potassium carbonate.

6. The composition of claim 1, wherein the amount of the source of copper ions is about 2 wt %, based on the total weight of the composition.

7. The composition of claim 6, wherein the source of copper ions is selected from copper chloride, copper hydroxide, copper oxychloride sulfate, copper sulfate, basic copper sulfate, copper carbonate, basic copper carbonate, copper oxide, copper oxychloride, copper ethylenediaminetetraacetic acid (EDTA) and mixtures thereof.

8. The composition of claim 7, wherein the source of the copper ions is selected from basic copper sulfate, copper hydroxide and basic copper carbonate.

9. The composition of claim 8, wherein the source of the copper ions is basic copper carbonate.

10. The composition of claim 2, wherein the alkali metal inorganic base is potassium carbonate, sodium carbonate, potassium bicarbonate, sodium bicarbonate, potassium hydroxide, sodium hydroxide or mixtures thereof.

11. The composition of claim 2, wherein an alkali metal salt of phosphorous acid is prepared in situ by combining the phosphorous acid and the alkali metal inorganic base in the composition.

12. The composition of claim 2, wherein the composition is prepared by a method comprising mixing the source of copper ions, the alkylamine, the alkali metal inorganic base with an aqueous solution comprising the phosphorous acid under conditions to obtain the composition.

13. The composition of claim 11, wherein the alkali metal salt of phosphorous acid is $K_2HPO_3$, $KNaHPO_3$, $Na_2HPO_3$, $KH_2PO_3$, $NaH_2PO_3$ or mixtures thereof.

14. The composition of claim 4, wherein the effective amount of the triethylenetetramine is about 14 wt %, based on the total weight of the composition.

15. The composition of claim 4, wherein the phosphorus acid and the triethylenetetramine are further combined with about 11 wt %, based on the total weight of the composition, of potassium carbonate.

16. The composition of claim 5, wherein the effective amount of the diethylenetriamine is about 9 wt %, about 12 wt %, about 15 wt % or about 17 wt %, based on the total weight of the composition.

17. A method for controlling a plant disease caused by a phytopathogenic organism, the method comprising contacting a plant and/or the soil surrounding the plant with an effective amount of a composition of claim 1.

18. The method of claim 17, wherein the phytopathogenic organism is a phytopathogenic fungus, bacterium, alga or virus.

19. The method of claim 18, wherein the phytopathogenic organism is a phytopathogenic fungus selected from Basidiomycetes, Ascomycetes, Deuteromycetes, Zygomycetes and Oomycetes.

20. The method of claim 18, wherein the phytopathogenic organism is a phytopathogenic bacterium selected from *Xanthomonas* spp., *Pseudomonas* spp., *Pantoea* spp., *Acidovorax* spp. and *Erwinia amylovora*.

21. The method of claim 17, wherein the plant is selected from cereals, fruit plants, nut trees, citrus trees, legumes, tubers, vegetables, cucurbitaceae, oleaginous plants, tobacco, coffee, tea, cocoa, sugar beet, sugar cane, herbs, hops, ginseng, grasses and cotton.

* * * * *